W. P. MILLER.
Attaching Burners to Lamps.
No. 56,775.
Patented July 31, 1866.
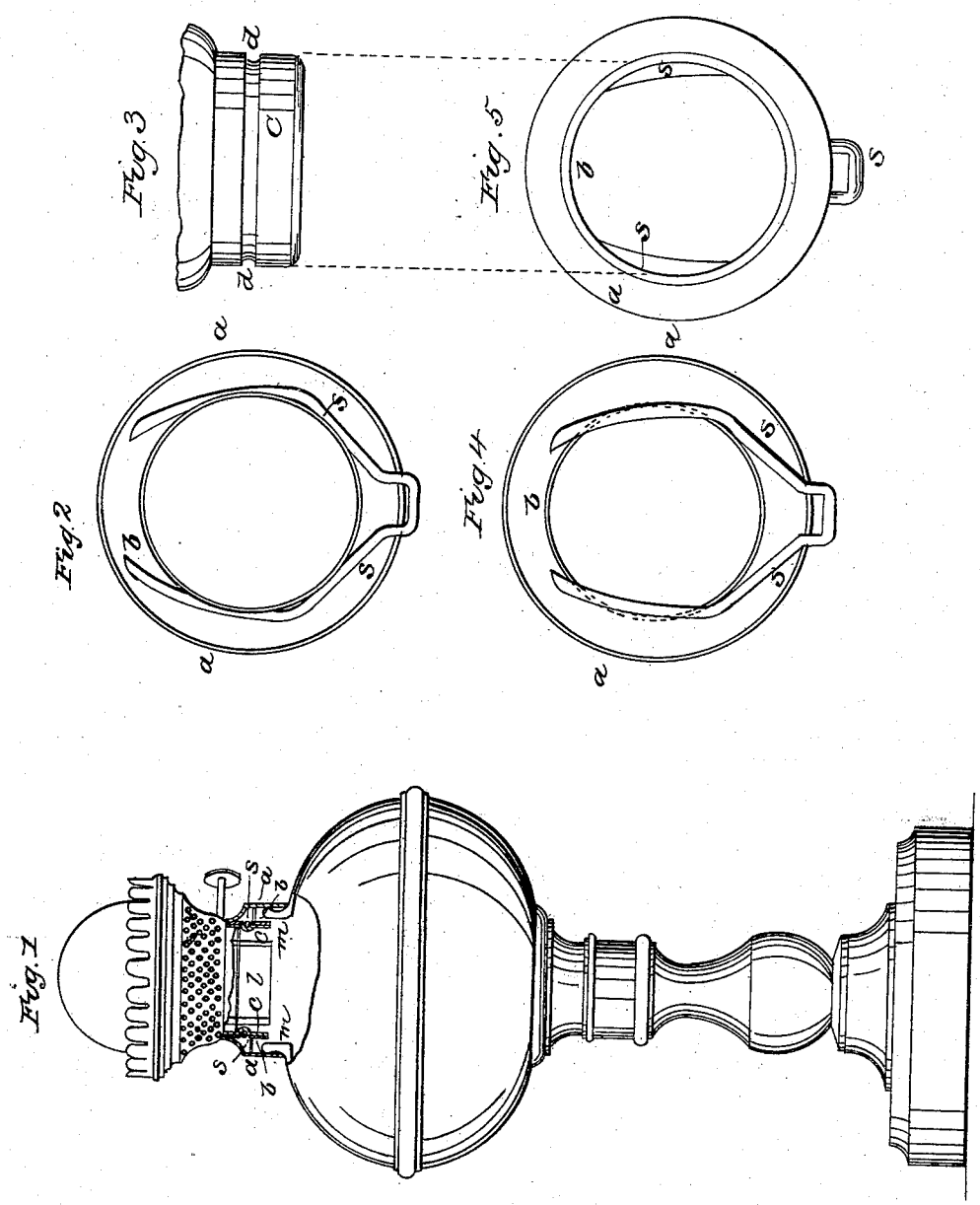
witnesses
Inventor
Warren P. Miller

UNITED STATES PATENT OFFICE.

WARREN P. MILLER, OF SAN FRANCISCO, CALIFORNIA.

IMPROVEMENT IN ATTACHING BURNERS TO LAMPS.

Specification forming part of Letters Patent No. 56,775, dated July 31, 1866.

*To all whom it may concern:*

Be it known that I, WARREN P. MILLER, of the city and county of San Francisco, and State of California, have invented a new and Improved Mode of Attaching Burners to Lamps; and I do hereby declare that the following is a full and exact description thereof, reference being had to the accompanying drawings, and to the letters of reference marked thereon.

The nature of my invention consists in constructing a socket within the collar to receive the shank of the burner and retain it in place by means of a spring inserted between the collar and socket, and operating through slits cut in the same.

To enable others skilled in the art to make and use my invention, I will proceed to describe its construction and operation.

I construct a socket, $b$, within the collar $a$, with a longitudinal slit in each side for the spring $s\ s$ to ply in. A slit is also cut through the collar $a$ for the end or butt of the spring to project through, so that it may be compressed with the thumb and expanded so as to disengage the burner, as shown in Figure 2. When the thumb is removed the spring will resume its natural position, lying across a segment of the circle formed by the collar $b$, as shown on Figs. 4 and 5.

Fig. 1 represents a lamp with a portion broken away at the collar, showing a transverse section of the collar $a$, socket $b$, burner-shank $d$, spring $s$, wick-tube $l$, and neck of fountain $m\ m$. Fig. 3 is a side view of the shank of the burner, which is made to fit into the socket $b$, and is confined there by means of the spring plying through the slits in the socket $b$ and into the groove $d$. Fig. 5 is a top view of the collar and spring.

What I claim as my invention, and desire to secure by Letters Patent, is—

The application of the grooved shank $c$, as shown at $d$, the socket $b$, and spring $s$, or their equivalents, when made to operate substantially in the manner described.

WARREN P. MILLER.

Witnesses:
P. MURPHY,
H. V. HERBERT.